June 12, 1962  E. H. KROHN  3,039,050
IMPEDANCE BRIDGE CIRCUIT
Filed March 21, 1958  3 Sheets-Sheet 1

INVENTOR.
EARL H. KROHN
BY
Joseph Weingarten
ATTORNEY

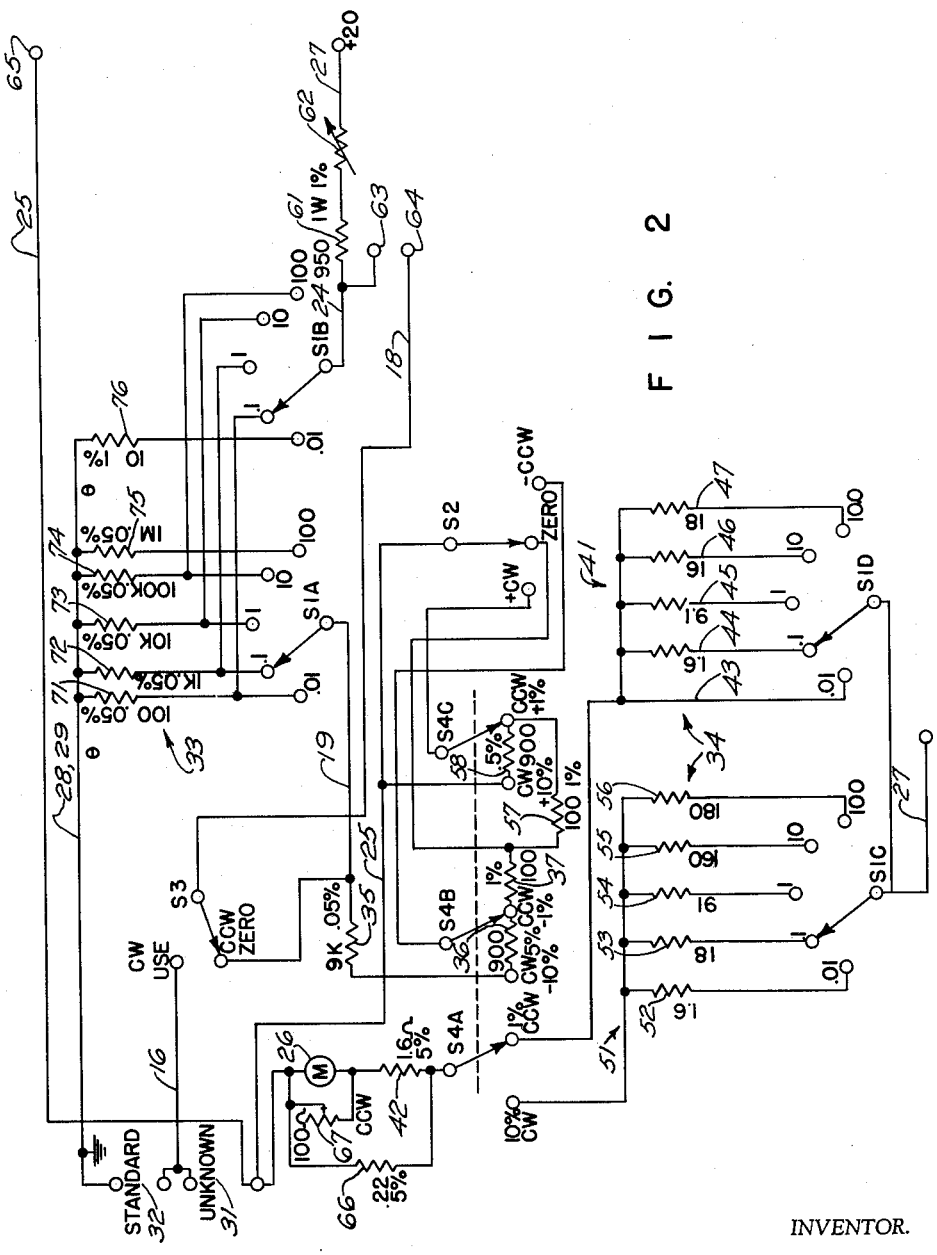

June 12, 1962 E. H. KROHN 3,039,050
IMPEDANCE BRIDGE CIRCUIT
Filed March 21, 1958 3 Sheets-Sheet 3

INVENTOR.
EARL H. KROHN
BY
*Joseph Weingarten*
ATTORNEY

United States Patent Office 3,039,050
Patented June 12, 1962

3,039,050
IMPEDANCE BRIDGE CIRCUIT
Earl H. Krohn, Brookline, Mass., assignor to Krohn-Hite Laboratories, Inc., Cambridge, Mass., a corporation of Massachusetts
Filed Mar. 21, 1958, Ser. No. 722,871
14 Claims. (Cl. 324—57)

The present invention relates in general to bridge circuits and more particularly concerns a novel impedance comparator for rapidly indicating the deviation of an unknown impedance from a standard impedance with great accuracy and over a wide range of impedance values. In accordance with a feature of the invention, the percentage deviation is directly indicated on a linear scale. Consequently, the same scale markings may be used for different full-scale percentage deviations.

The use of bridge circuits for measuring an unknown impedance is well known in the art. Basically, these circuits have a pair of serially-connected ratio arms in parallel with the serial combination of a standard impedance and the unknown impedance. When used as an impedance comparator, the ratio arm and standard impedances are generally selected to achieve balance whenever the ratio of unknown to standard impedance is a prescribed rational number. The degree of unbalance is indicated by the potential difference between the junction of the ratio arm impedances and the junction of the unknown and standard impedances when a fixed amplitude signal from an external power source is applied to the remaining pair of opposed junctions.

For a bridge with equal ratio arms energized by a signal of fixed amplitude E, it can be shown that this potential difference is:

$$\frac{E}{2}\left(\frac{Z_s-Z_x}{Z_x+Z_s}\right)$$

where $Z_s$ and $Z_x$ are standard and unknown impedances, respectively. Since it is generally desired to determine percentage deviations, the scale of the meter indicating this potential difference is calibrated in percent deviation above and below the standard. From the nature of the equation it is evident that a voltage increment corresponding to a fixed positive percentage deviation corresponds to a lesser negative deviation. Thus, if $Z_x$ differs from $Z_s$ by 10% of the latter, the potential difference corresponding to positive and negative deviations is $$-\frac{E}{2}\frac{.1}{2.1}$$

or —.0238E and $$\frac{E}{2}\frac{.1}{1.9}$$

or .0263E, respectively.

Such a nonlinear scale has a number of disadvantages. If it is desired to use different full-scale meter ranges, separate calibration markings line the different scales. This is confusing to an unskilled operator when different ranges are used for making rapid measurements of components required to meet different tolerances. Moreover, there is a zero shift as the range is changed when equal maximum percentage deviations are indicated at the extremities of the scale.

Consider the problem of selecting resistors for matched pairs where each resistor of a pair must differ from the other by no more than 1% of a standard value and from the standard value by no more than 10%. It is evident that with the nonlinear scale, less accuracy in selecting a matched pair in the range 9% to 10% above the standard value is obtainable than for a pair in the corresponding range below the standard value.

The present invention contemplates and has as a primary object the provision of an impedance comparator for accurately indicating the fractional deviation of a variable impedance from a standard impedance on a linear scale.

It is another object of the invention to indicate impedance deviations in accordance with the preceding object over a wide range of impedance while minimizing the number of precision components required.

Another object of the invention is to indicate percentage impedance deviations over different full-scale ranges while using the same scale markings.

Still a further object of the invention is to provide percentage deviation indication in accordance with the preceding objects with apparatus including a bridge circuit energized by an A.-C. signal source and an unbalanced A.-C. amplifier.

According to the invention, a signal common to the variable and standard impedance in a bridge circuit is maintained constant, and another signal, directly proportional to the common signal and variable impedance, is sensed to obtain an indication linearly related to the fractional deviation of the variable impedance from a standard value.

More specifically, an amplifier senses the difference in potential between the junction of the variable and standard impedances and the junction of a serially-connected pair of attenuator impedances connected across a power source supplying a potential signal of constant amplitude. The differential amplifier provides a current to the bridge impedances of such a magnitude that this potential difference is reduced to zero, resulting in the same current flowing through the variable impedance, regardless of its deviation from standard value. Sensing the difference between the voltage across the attenuator and the voltage across the bridge yields an output potential linearly related to the fractional deviation of the variable impedance from the standard value. The novel techniques are usuable in connection with both A.-C. and D.-C. signal sources.

Other features, objects and advantages will become apparent from the following specification when read in connection with the accompanying drawing in which:

FIG. 2 is a schematic circuit diagram of a specific bridge circuit and attenuator, showing an arrangement for the optimum utilization of precision resistors;

Figure 1:
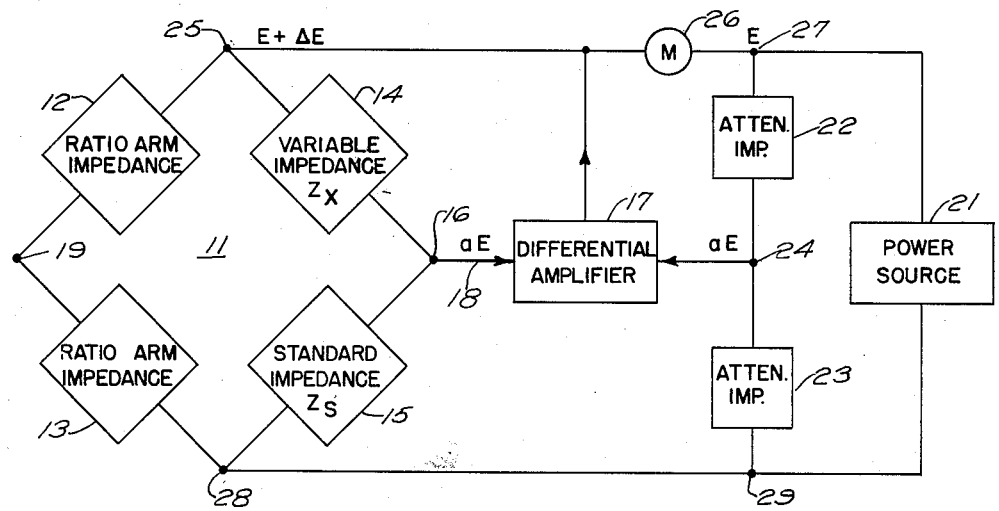
FIG. 1 is a block diagram of an embodiment of the invention.

With reference now to the drawing and more particularly FIG. 1 thereof, there is illustrated a block diagram of the novel system.

A bridge 11 comprises a pair of serially-connected ratio arm impedances 12 and 13 connected in parallel with the serial combination of a variable or unknown impedance 14 and a standard or reference impedance 15. The junction 16 of the latter two impedances is coupled to one input of differential amplifier 17. A power source 21 supplies a constant potential across an attenuator formed of impedance 22 serially-connected to impedance 23. The junction 24 of the latter two impedances is coupled to the other input of differential amplifier 17.

The output of differential amplifier 17 is coupled to junction 25 of bridge 11. A meter 26 is connected between junction 25 and junction 27. Junction 28 of bridge 11 and junction 29 are connected together.

Having described the physical arrangement of the system, its mode of operation will be discussed. The impedance range is selected by choosing an appropriate ratio of ratio arm impedance 12 to ratio arm impedance 13. The ratio of attenuator impedance 22 to attenuator impedance 23 is selected to be the same. If this ratio is $r$, and the potentials on junctions 27 and 24 are E and $a$E, respectively, the potentials on junctions 25 and 16 are respectively the same if the variable impedance 14, $Z_x$, is a standard value equal to $r$ times the standard impedance 15, $Z_s$. Therefore, the difference in potential, $\Delta$E, between junctions is then zero and meter 26 indicates accordingly. This signifies that the deviation of $Z_x$ from the standard value is zero.

Now consider a change in variable impedance 14. This will initially cause a corresponding change in potential at junction 16. Differential amplifier 17 responds to the difference in potential between junctions 16 and 24 by altering the current supplied to junction 25 until the potential at junction 16 reaches $a$E and the difference sensed is zero. Therefore, the common current through impedances 14 and 15 remains substantially constant and equal to $$\frac{aE}{Z_s}$$

The potential at junction 25 is the sum of the voltage at junction 16, $a$E, and the drop across impedance 14, $$\frac{aE}{Z_s}Z_x$$

or $$E\left(a+\frac{aZ_x}{Z_s}\right)$$

The difference in potential between junctions 25 and 27, $\Delta$E, measured by meter 26 is the above expression less E or $$\frac{E}{Z_s}(aZ_s+aZ_x-Z_s)$$

For $r=1$, $a=\frac{1}{2}$; and $$\Delta E=\frac{E}{2Z_s}(Z_x-Z_s)$$

Observe that the voltage difference, $\Delta$E, is a linear function of the fractional deviation, $$\frac{Z_x-Z_s}{Z_s}$$

for variations in $Z_x$. Thus, if $Z_x$ is 10% above or below $Z_s$, $\Delta$E is the same magnitude, $$\frac{E(.1)}{2Z_s}$$

or .05E, although of opposite sense. Note also that the sensitivity is nearly twice that obtained with conventional bridges since a voltage change across the entire bridge is sensed.

With reference to FIG. 2, there is illustrated a preferred embodiment of a resistive bridge having two different full scale ranges and five selectable ratios. Before discussing operating procedures, the circuit arrangement and its relation to the block diagram of FIG. 1 will be described. Typical resistance values and tolerances are designated in FIG. 2.

The variable impedance 14 and standard impedance 15 are connected between terminal pairs 31 and 32, respectively. Single pole multi-throw switches S1A, S1B, S1C and S1D are ganged. Switch S1A selects one of the group of precision resistors 33 as ratio arm impedance 13. Switch S1B selects a different one of resistors 33 for attenuator impedance 23. Switches S1C and S1D select one of the resistors 34 corresponding to the desired full scale range of meter 26 and the selected ratio.

Switch S2, when in the Zero position, as shown, connects the serial combination of resistors 35, 36 and 37, forming ratio arm impedance 12, to junction 25.

Switch S3 in the CCW Zero position, as shown, connects the input line 18 of differential amplifier 17 to the junction 19 of the ratio arm impedances 12 and 13 for initially calibrating the bridge.

Single pole double-throw switches S4A, S4B and S4C are ganged. Switch S4A in the 1% position, as shown, couples bus 41 to resistor 42 whereby one of the resistances 43, 44, 45, 46 or 47 determines the meter sensitivity in accordance with the selected ratio. In the 10% position, the bus 51 is coupled to resistor 42 and the meter sensitivity is determined by one of resistors 52, 53, 54, 55 or 56.

With switch S2 in the CCW position, switch S4B effectively removes one or both of resistors 36 and 37 from ratio arm impedance 12. When switch S2 is in the CW position, switch S4C selectively adds one or both of resistances 57 and 58 to ratio arm impedance 12.

Resistance 61 and serially-connected variable resistance 62 form attenuator impedance 22.

Respective inputs of differential amplifier 17 are coupled to terminals 63 and 64 and its output energizes terminal 65.

Resistance 66 prevents meter 26 from being damaged and variable meter shunt resistance 67 permits adjustment of the meter indication counterclockwise from zero corresponding to maximum negative percentage deviation.

The preceding description of the circuit arrangement in relation to the block diagram of FIG. 1 should facilitate understanding the operating procedures for making accurate measurements.

Unknown and standard resistances are connected to terminal pairs 31 and 32, respectively, and the desired ratio selected with switch S1. Thus, ratio arm impedance 13 is one of resistors 71—75 and attenuator impedance 23 is one of resistors 72—76. For the designated resistance values, a ratio of 0.1 is selected with switch S1 as shown. Ratio arm impedance 13 and attenuator impedance 23 are, therefore, resistances 72 and 71, respectively. A full scale meter range is selected with switch S4. If the 1% range is selected, switch S4 is positioned as shown, and resistor 44 determines the meter sensitivity.

Initial adjustment is made with switch S3 in the CCW Zero position and switch S2 in the Zero position as shown. The junction 19 of ratio arm impedances 12 and 13 is then connected to input line 18 of differential amplifier 17, causing the latter to provide an output current to the bridge such that the difference in potential between junctions 19 and 24 is zero. Variable resistance 62 is then adjusted until meter 26 reads exactly zero. Since the ratio of ratio impedance 13 to impedance 12 is the same as the ratio of attenuator impedance 23 to impedance 22, or .1, the value of variable resistance 62 will then be very nearly 50 ohms for the designated resistance values. This completes the zero adjustment.

The next step is to adjust the counterclockwise meter indication to correspond to full scale percentage deviation. Switch S2 is moved to the CCW position. This shorts the 100 ohm resistance 37, causing exactly a 1% decrease in the value of ratio arm impedance 12 and a corresponding counterclockwise deflection in the indication of meter 26. Variable resistance 67 is then adjusted until the meter indicates exactly a deviation of −1%. The meter is now calibrated.

A final check is made by moving switch S2 to the CW position. This adds the 100 ohm resistance 57 to ratio arm impedance 12, causing exactly a 1% increase in its value. Meter 26 then should indicate exactly a deviation of +1%. This occurs because of the linear relation between measured potential difference and percentage deviation. Having determined two points in this relation by making zero and maximum counterclockwise adjustments, the entire relation is uniquely established.

The bridge is now accurately adjusted and unknown impedances may be connected to terminal pair 31 and percentage deviation from a standard value will be accurately indicated on meter 26.

To obtain precise measurements, ratio determining resistances must be held within close tolerances, requiring resistances relatively high in cost. However, the total cost is minimized because of the novel switching arrangement wherein five of the six resistors serve as both ratio arm and attenuator impedances.

For making D.-C. measurements, differential amplifier 17 is preferably a chopper stabilized D.-C. amplifier. With E being 20 volts and using the indicated parameters, deviations accurate to within 0.1% are obtained over an impedance range extending from 10 ohms to over 100 megohms. The voltage E may be lowered to facilitate measuring deviations of still lower impedances.

For practical reasons, it is generally preferred that junction 27 be grounded. Meter 26 is then at ground potential and does not affect the bridge balance, even when very high resistances are being measured.

Figure 3:
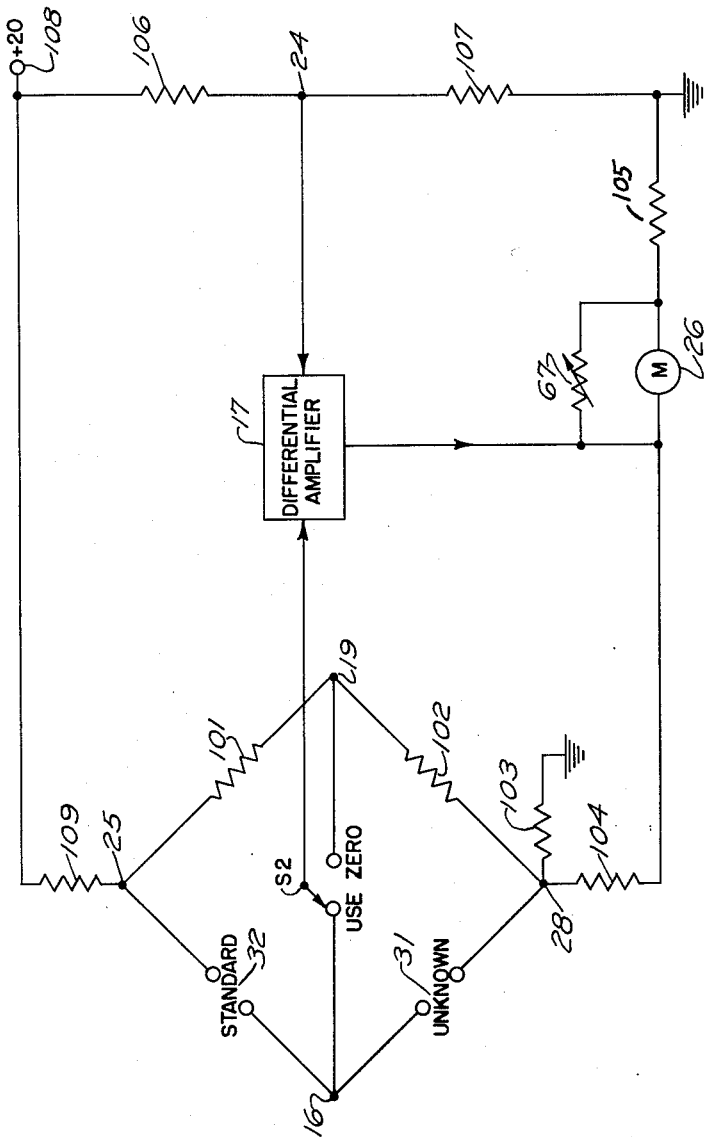
FIG. 3 is a block-schematic circuit diagram of the novel comparator providing increased meter sensitivity when measuring low resistance.

With reference to FIG. 3, there is illustrated a combined block-schematic circuit diagram of the novel bridge with the meter arranged in series with the ground lead and incorporating an additional feature for increasing meter sensitivity when measuring low resistances. At low resistances, the incremental change in voltage across the bridge for a given percentage deviation is small. For properly observing small deviations, a meter amplifier would normally be required. However, the arrangement of FIG. 3 provides adequate sensitivity by advantageously utilizing the gain available from differential amplifier 17.

Before discussing the mode of operation, the circuit arrangement will be described. This includes terminal pairs 31 and 32 for connecting unknown and standard resistances, respectively. Switched ratio arm resistance 101 is connected between junction 25 and junction 19 in series with ratio arm resistance 102, the latter being connected to junction 28. A feedback attenuator is formed in the feedback, or beta network by switched resistance 103 and resistance 104, connected from junction 28 to ground and the output of differential amplifier 17, respectively. Meter 26, shunted by resistance 67, is also connected to the output of differential amplifier 17 and to ground through switched range resistor 105. Switched attenuator resistance 106 and attenuator resistance 107 are serially connected between terminal 108, maintained at 20 volts positive, and ground. The junction 24 of the latter resistances is connected to one input of differential amplifier 17. Switch S2 in the use position as shown connects junction 16 to the other input of differential amplifier 17. A source compensating resistance 109 connects junction 25 to terminal 108. The ratio of resistance 109 to the parallel combination of resistances 103 and 104 is the same as the ratio of ratio arm resistance 101 to resistance 102 and attenuator resistance 106 to resistance 107.

Operation of this circuit is essentially the same as that of the system of FIG. 1; however, differential amplifier 17 has sufficient gain to maintain zero potential difference between junctions 16 and 24, despite the addition of feedback attenuator resistances 103 and 104. By choosing the ratio of resistance 109 to the parallel combination of resistances 103 and 104 as indicated, the potential on junction 25 drops by the amount junction 104 rises multiplied by the ratio of the ratio arms. This preserves the same ratio of voltages across top and bottom halves of the bridge as is present without multiplication; yet, the potential variation sensed by meter 26 is across the bridge in series with the additional resistances. The voltage variation sensed for a given impedance deviation is thus increased accordingly.

Figure 4:
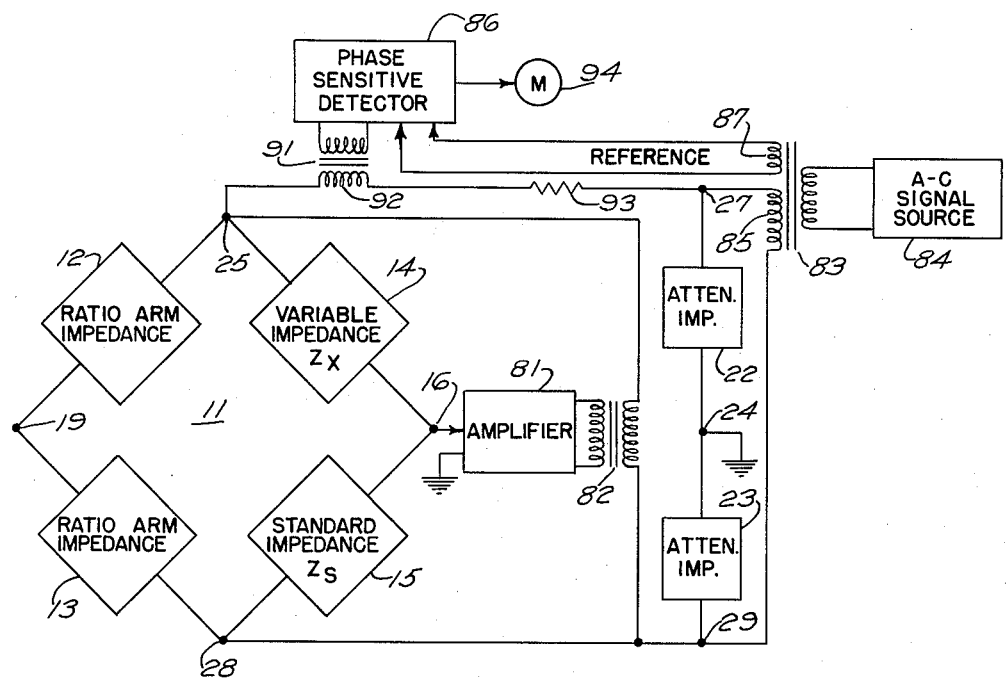
FIG. 4 is a block diagram of the novel impedance comparator especially suitable for use with an A.-C. signal source.

With reference to FIG. 4, there is illustrated a block diagram of the novel comparator, especially suitable for use with A.-C. signal sources. The bridge 11 is the same as in FIG. 1. By employing transformers, differential amplifier 17 of FIG. 1 may be replaced by single-ended A.-C. amplifier 81 energized by the signal on junction 16. Junction 24 between attenuator impedances 22 and 23 is grounded. The output of amplifier 81 is applied across junctions 25 and 28 of bridge 11 through transformer 82.

Transformer 83 couples the output of A.-C. signal source 84 across attenuator impedances 22 and 23 at junctions 27 and 29 through a first secondary winding 85. A reference signal is coupled from source 84 to one input of phase sensitive detector 86 through a second secondary winding 87. The other input of detector 86 is coupled to junction 25 of bridge 11 through transformer 91. The primary 92 of this transformer is connected directly to junction 25 and to junction 27 through range resistor 93. The D.-C. output signal from phase sensitive detector 86 energizes meter 94 which indicates the deviation of impedance 14 from the standard value.

The mode of operation is similar to that described above in connection with the embodiment of FIG. 1. The output signal from amplifier 81 is altered until junction 16 is at ground potential, the same as junction 24. The magnitude of the A.-C. signal at junction 27 remains constant; therefore, the difference in potential between junctions 25 and 27 characterizes the deviation of variable impedance 14 from the standard value.

This difference is sensed by phase sensitive detector 86 which provides a D.-C. signal output proportional to the product of the A.-C. reference signal of constant amplitude from secondary winding 87 and the A.-C. current flowing through primary winding 92. When the difference in potential between junctions 25 and 27 is zero, signifying that variable impedance 14 has the standard value, no current flows through primary winding 92 and the D.-C. signal output is zero. When the A.-C. signal amplitude on junction 25 is less and greater than that on junction 27, the D.-C. output signal indicated by meter 94 is negative and positive, respectively. Phase sensitive detectors of this type are well known in the art and need not be described in detail herein. Resistor 93 determines the sensitivity of the detecting system in accordance with the desired full-scale percentage deviation on meter 94. The balancing and ratio switching arrangements described in connection with FIG. 2 are applicable to the system of FIG. 3, the selected one of the group of resistors 34 corresponding to range resistor 93.

The detailed description for illustrating the invention by way of example referred to maintaining the current through the variable impedance constant, regardless of its value. Within the scope of the inventive concepts, the voltage across this impedance may be held invariant. This is especially convenient for measuring admittance deviations with admittance arms arranged in a configuration which is the dual of a conventional impedance bridge. The principles disclosed herein are applicable to complex impedances energized by A.-C. signals.

It is apparent that those skilled in the art may make numerous other modifications of and departures from the specific embodiment described herein without departing from the inventive concepts. Consequently, the invention is to be construed as limited only by the spirit and scope of the appended claims.

What is claimed is:
1. A bridge circuit comprising, a bridge wherein one branch is formed of a standard impedance serially connected to a variable impedance, means for energizing said bridge including said branch to excite a voltage signal across and a current signal through said variable impedance, means for deriving a correctional signal from said bridge indicative of the value of one of said voltage and said current signals, and means for coupling said correctional signal to said bridge energizing means to control the energy applied to said bridge whereby said one signal remains substantially constant independently of the value of said variable impedance.

2. A bridge circuit comprising a bridge including one branch formed of a standard impedance serially connected to a variable impedance, means including an amplifier for energizing said bridge to excite a current common to said standard and variable impedances, a source of a reference signal, means for coupling said reference signal source and the junction of said standard and said variable impedances to said amplifier to alter said common current until the difference between said reference signal and the potential signal across said standard impedance is substantially zero whereby said current remains constant independently of the value of said variable impedance.

3. A bridge circuit comprising, a bridge including a branch formed of a standard impedance serially-connected to a variable impedance, means for energizing said bridge to excite a current common to said standard and said variable impedances, and means for coupling the voltage across said standard impedance to said bridge energizing means, said energizing means being arranged to respond to said voltage to maintain said common current constant independently of the value of said variable impedance.

4. A bridge circuit comprising, a bridge including a branch formed of a standard impedance connected to a variable impedance, means including an amplifier for energizing said bridge to excite a voltage signal across and a current signal through said variable impedance, means for deriving a correctional signal from said bridge indicative of the value of one of said voltage and said current signals, and means for applying said correctional signal to said amplifier to control the energy applied to said bridge whereby said one signal remains substantially constant independently of the value of said variable impedance.

5. A bridge circuit comprising, a bridge including a pair of ratio arm impedances and the combination of a standard impedance and variable impedance coupled to said ratio arm impedances, means for energizing said bridge to excite a voltage signal across and a current signal through said variable impedance, means for deriving a correctional signal from said bridge indicative of the value of one of said voltage and said current signals, and means for coupling said correctional signal to said bridge energizing means to control the energy applied to said bridge whereby said one signal remains substantially constant regardless of the value of said variable impedance.

6. A bridge circuit comprising, a pair of serially-connected ratio arm impedances connected in parallel with the serial combination of a standard and variable impedance, means for energizing said impedances to maintain constant current through said variable impedance, and means for deriving a signal characteristic of the degree of unbalance in said bridge circuit to provide an indication of the deviation of said variable impedance from said standard.

7. A bridge circuit comprising, a bridge including a pair of serially connected ratio arm impedances in parallel with the series combination of a standard impedance and a variable impedance, means for energizing said bridge to excite a signal common to said standard and variable impedances, means for maintaining the amplitude of said common signal substantially constant regardless of the value of said variable impedance, and means for deriving a signal characteristic of the degree of unbalance in said bridge circuit to provide an indication of the deviation of said variable impedance from said standard.

8. A bridge circuit comprising, a pair of serially connected ratio arm impedances, in parallel with a branch formed of serially connected standard and variable impedances, an attenuator having a pair of serially-connected impedances whose ratio is substantially the same as that of said ratio arm impedances, means for coupling said attenuator in parallel with said ratio arm impedances and with said branch formed of said standard and said variable impedances, means for applying power to said ratio arm, attenuator and serially connected standard and variable impedances in parallel and exciting a signal common to said standard and said variable impedances, means responsive to the difference in signal values at the junction of said said standard and said variable impedance and the junction of said attenuator impedances for reducing said difference to zero, thereby maintaining said common signal substantially constant, and means responsive to the difference in signals across said attenuator and across said impedance combination for providing an indication of the deviation of said variable impedance from said standard.

9. A bridge circuit comprising, a pair of serially-connected ratio arm impedances connected in parallel with the serial combination of a standard and variable impedance, an attenuator having a pair of serially-connected impedances whose ratio is substantially the same as that of said ratio arm impedances, means for energizing said ratio arm impedances, said serial combination of standard and variable impedances and attenuator impedances in parallel and exciting a current common to said standard and said variable impedances, means responsive to the potential difference between the junction of said standard and said variable impedances and the junction of said attenutaor impedances for reducing said difference to substantially zero by maintaining said common current substantially constant, and indicating means responsive to the difference in voltage across said serial combination and the voltage across said attenuator for indicating the deviation of said variable impedance from said standard impedance.

10. Apparatus in accordance with claim 9 and further comprising a plurality of ratio determining impedances, and means for selecting corresponding ones of said ratio determining impedances as respective ones of said ratio arm and said attenuator impedances to determnie said ratio, there being one more of said ratio determining impedances than selectable ratios.

11. Apparatus in accordance with claim 9 wherein said indicating means is a meter, and further comprising a group of resistors, and means for selecting a resistor from said group to alter the sensitivity of said meter in accordance with the ratio selected.

12. Apparatus in accordance with claim 11 wherein said meter has a linear scale calibrated to indicate the fractional deviation of said variable impedance from said standard impedance, there are a plurality of said groups each corresponding to a different full-scale fractional deviation indicated by said meter, and means for selecting one of said groups.

13. An impedance comparator comprising, an impedance bridge formed of the serial combination of standard and variable impedances connected in parallel with the serial combination of first and second ratio arm impedances, a common terminal, a power terminal energized by a power source and maintained at a potential of substantially constant amplitude relative to said common terminal, an attenuator formed of serially-connected first and second attenuator impedances connected between said power and common terminals, a source compensating impedance connected between said power terminal and one of the junctions between said impedance bridge serial combinations, a differential amplifier having inputs coupled to and responsive to the difference in potential between the junction of said standard and variable impedances and the junction of said attenuator impedances to provide an output signal for reducing said difference in potential, a feedback attenuator network coupling said output signal to the other junction of said impedance bridge serial combinations, said source compensating impedance being substantially equal to the impedance of said feedback attenuator network between said other junction and said common terminal, and indicating means responsive to the potential across said feedback attenuator network relative to said common terminal.

14. An impedance comparator comprising, an impedance bridge formed of the serial combination of standard and variable impedances connected in parallel at first and second opposed junctions to the serial combination of first and second ratio arm impedances, an attenuator formed of first and second serially-connected attenuator impedances, a signal source providing an A.-C. signal of substantially constant amplitude across said attenuator, a common terminal connected to the junction of said first and second attenuator impedances, a single-ended amplifier having an input coupled to the junction of said standard and variable impedances and an output coupled to said first junction, said amplifier being thereby responsive at its input to the potential on said junction of variable and standard impedances relative to said common terminal said amplifier providing an output signal to said first junction arranged whereby the magnitude of said potential is reduced, means for deriving a reference signal from said signal source, and a phase sensitive detector responsive to said reference signal and the difference between the potential across said impedance bridge and the potential across said attenuator for providing an indication of the deviation of said reference impedance from said standard impedance.

References Cited in the file of this patent

UNITED STATES PATENTS

| | | |
|---|---|---|
| 2,719,263 | Flowers et al. | Sept. 27, 1955 |
| 2,771,579 | Ruge | Nov. 20, 1956 |

OTHER REFERENCES

Rondeau: General Electric Review, "Self-Balancing Resistance Bridge," October 1949, volume 52, No. 10, pages 45 and 46.